(12) United States Patent
Hsiao et al.

(10) Patent No.: US 10,018,763 B2
(45) Date of Patent: Jul. 10, 2018

(54) TRANSPARENT DISPLAY DEVICE

(71) Applicant: Shenzhen China Star Optoelectronics Technology Co., Ltd., Shenzhen (CN)

(72) Inventors: Yu-Chun Hsiao, Shenzhen (CN); Shih Hsiang Chen, Shenzhen (CN); Guofu Tang, Shenzhen (CA); Quan Li, Shenzhen (CN); Chengling Lv, Shenzhen (CN); Chaofan Guo, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 379 days.

(21) Appl. No.: 14/411,103

(22) PCT Filed: Nov. 20, 2014

(86) PCT No.: PCT/CN2014/091720
§ 371 (c)(1),
(2) Date: Dec. 24, 2014

(87) PCT Pub. No.: WO2016/078046
PCT Pub. Date: May 26, 2016

(65) Prior Publication Data
US 2016/0349435 A1    Dec. 1, 2016

(30) Foreign Application Priority Data
Nov. 17, 2014  (CN) .......................... 2014 1 0658646

(51) Int. Cl.
*G02F 1/1335*  (2006.01)
*F21V 8/00*  (2006.01)
*G02B 5/30*  (2006.01)

(52) U.S. Cl.
CPC ......... *G02B 6/0016* (2013.01); *G02B 6/0023* (2013.01); *G02B 6/0031* (2013.01);
(Continued)

(58) Field of Classification Search
CPC ......... G02F 1/133615; G02F 1/133528; G02F 1/1335; G02F 1/133502
See application file for complete search history.

(56) References Cited

U.S. PATENT DOCUMENTS

2003/0030764 A1\*  2/2003  Lee ....................... G02B 6/0036
                                                              349/65
2008/0218657 A1\*  9/2008  Hwang ................ G02B 6/0076
                                                              349/62
(Continued)

FOREIGN PATENT DOCUMENTS

CN         102537785 A    7/2012
JP         2001215505 A   8/2001
(Continued)

*Primary Examiner* — James Dudek
(74) *Attorney, Agent, or Firm* — JMB Davis Ben-David (57) ABSTRACT

A transparent display device is provided herein, which comprises a display module and a backlight module. The display module includes a liquid crystal display panel, polarizers and an optical film. The backlight module includes a light source and a light guide plate, wherein the light guide plate includes a first light incident plane, a second light incident plane and a light emitting plane. The first light incident plane is disposed opposite to a light emitting plane of the light source. A plurality of caves are disposed on the second light incident plane to enhance the environmental light. The present invention raises an incident amount of the environmental light.

16 Claims, 4 Drawing Sheets

(52) U.S. Cl.
CPC ......... *G02B 6/0053* (2013.01); *G02B 6/0068* (2013.01); *G02F 1/1335* (2013.01); *G02F 1/133528* (2013.01); *G02B 5/30* (2013.01); *G02F 2001/133618* (2013.01)

(56) References Cited

U.S. PATENT DOCUMENTS

| | | | |
|---|---|---|---|
| 2010/0079708 A1* | 4/2010 | Takahashi | G02B 5/0221 349/96 |
| 2011/0310470 A1* | 12/2011 | Horie | G02F 1/133502 359/352 |
| 2012/0163021 A1 | 6/2012 | Bohn | |
| 2012/0300307 A1* | 11/2012 | Borrelli | G02F 1/133502 359/609 |

FOREIGN PATENT DOCUMENTS

| | | |
|---|---|---|
| KR | 20120015010 A | 2/2012 |
| TW | 201317673 A1 | 5/2013 |

\* cited by examiner

TRANSPARENT DISPLAY DEVICE

CROSS-REFERENCE TO RELATED APPLICATIONS

This is the U.S. National Stage of International Application No. PCT/CN2014/091720, filed Nov. 20, 2014, which in turn claims the benefit of China Patent Application No. 201410658646.9, filed Nov. 17, 2014.

BACKGROUND OF THE INVENTION

Field of Invention

The present invention relates to a field of displays, and in particular to a transparent display device.

Description of Prior Art

A transparent device means that a display panel has a certain level of transparency by itself, with a capability of displaying the background of the back side of the transparent display panel, clearly. A transparent display panel is suitable for windows of buildings, cars, and shops. Apart from an original function of a transparent display, the transparent display panel has a development potential as the market focus on possibly displaying messages on the panel in the future.

Figure 1:
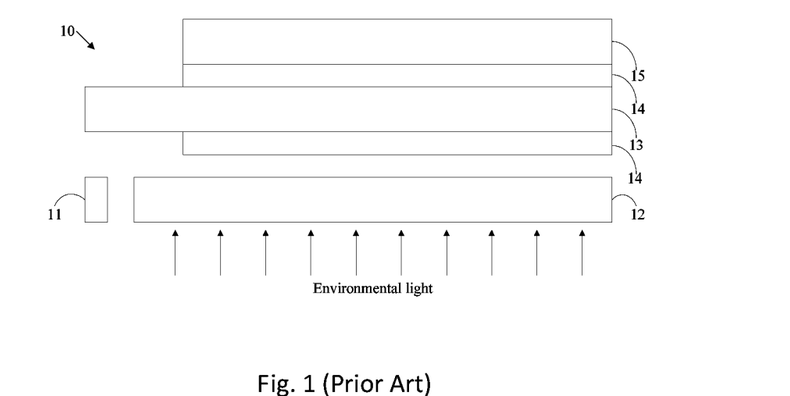
FIG. 1 is a schematic structural view of a prior transparent display device.

FIG. 1 is a schematic structural view of a prior transparent display device. The transparent display device 10 comprises a light source 11, a light guide plate 12, a transparent display panel 13, a polarizer 14, and an optical thin film 15. By external natural light to look objects behind the transparent display device, the transparent frame performance of the transparent display device would be poor if the brightness of the external natural light is low, affecting the transparent display effectiveness of the transparent display device poor.

Therefore, a transparent display device is needed to solve the problem in the prior art.

SUMMARY OF THE INVENTION

An objective of the present invention is to provide a transparent display device which is able to enhance the transparent-displaying performance to solve a technical problem of the prior transparent display device that has the poor transparent frame performance of the transparent display device.

To achieve the above objective, the present invention provides a transparent display device, comprising:

A display module, which comprises a liquid crystal display panel configured to display image pixels; polarizers is disposed on a light emitting plane and a light incident plane of the liquid crystal display panel to form a corresponding polarizing light; and an optical thin film disposed on the polarizer of the light emitting plane of the liquid crystal display panel to improve a display performance of the liquid crystal display panel.

A backlight module, which comprises: a light source used to provide emitting light; and a light guide plate used to guide the emitting light of the light source and environmental light into the liquid crystal display panel.

The light guide plate comprises a first light incident plane, a second light incident plane, and a light emitting plane; the first light incident plane is disposed opposite to a light emitting plane of the light source, and a plurality of caves are disposed on the second light incident plane to enhance the environmental light.

The light emitting plane of the light guide plate is disposed opposite to the light incident plane of the liquid crystal panel. The second light incident plane of the light guide plate and the light emitting plane of the light guide plate are disposed on two ends of the light guide plate.

A plurality of protrusions are disposed on the second light incident plane of the light guide plate to enhance the environmental light.

In the transparent display device of the present invention, the backlight module further comprises a brightness enhancement film disposed on the second light incident plane of the light guide plate.

In the transparent display device of the present invention, the caves and the protrusions are disposed in interlacing.

In the transparent display device of the present invention, the caves are shaped in triangles, trapezoids, or ovals.

In the transparent display device of the present invention, the protrusions are shaped in triangles, trapezoids, or ovals.

In the transparent display device of the present invention, the optical thin film is an anti-reflective film.

The present invention further provides another transparent display device, comprising:

A display module, which comprises a liquid crystal display panel configured to display image pixels; polarizers disposed on a light emitting plane and a light incident plane of the liquid crystal display panel to form a corresponding polarizing light; and an optical thin film disposed on the polarizer of the light emitting plane of the liquid crystal display panel to improve a display performance of the liquid crystal display panel.

A backlight module, which comprises: a light source used to provide emitting light; and a light guide plate used to guide the emitting light of the light source and environmental light into the liquid crystal display panel.

The light guide plate comprises a first light incident plane, a second light incident plane, and a light emitting plane; the first light incident plane is disposed opposite to a light emitting plane of the light source, and a plurality of caves are disposed on the second light incident plane to enhance the environmental light.

In the transparent display device of the present invention, the light emitting plane of the light guide plate is disposed opposite to the light incident plane of the liquid crystal panel, the second light incident plane of the light guide plate and the light emitting plane of the light guide plate are disposed on two ends of the light guide plate.

In the transparent display device of the present invention, the backlight module further comprises a plurality of protrusions disposed on the second light incident plane of the light guide plate to enhance the environmental light.

In the transparent display device of the present invention, the backlight module further comprises a brightness enhancement film disposed on the second light incident plane of the light guide plate.

In the transparent display device of the present invention, the caves and the protrusions are disposed in interlacing.

In the transparent display device of the present invention, the caves are shaped in triangles, trapezoids, or ovals.

In the transparent display device of the present invention, the protrusions are shaped in triangles, trapezoids, or ovals.

In the transparent display device of the present invention, the optical thin film is an anti-reflective film.

The present invention further provides still another transparent display device, comprising:

A display module, which comprises: a liquid crystal display panel configured to display image pixels; polarizers disposed on a light emitting plane and a light incident plane of the liquid crystal display panel to form a corresponding polarizing light; and an optical thin film disposed on the polarizer of the light emitting plane of the liquid crystal display panel to improve a display performance of the liquid crystal display panel.

A backlight module, which comprises: a light source used to provide emitting light; and a light guide plate comprising a first light incident plane, a second light incident plane, and a light emitting plane; the light guide plate being used to guide the emitting light of the light source and environmental light into the liquid crystal display panel, the first light incident plane being disposed opposite to a light emitting plane of the light source; an optical element disposed on the second light incident plane of the light guide plate, and a plurality of caves disposed on a light incident plane of the optical element to enhance the environmental light.

In the transparent display device of the present invention, the light emitting plane of the light guide plate is disposed opposite to the light incident plane of the liquid crystal panel, the second light incident plane of the light guide plate and the light emitting plane of the light guide plate are disposed on two ends of the light guide plate.

In the transparent display device of the present invention, the backlight module further comprises a brightness enhancement film disposed on the light incident plane of the optical element.

In the transparent display device of the present invention, the caves are shaped in triangles, trapezoids, or ovals.

In the transparent display device of the present invention, the optical thin film is an anti-reflective film.

With comparison to the transparent display device of the prior art, in the transparent display device of the present invention, by disposing the caves on the second light incident plane of the light guide plate and the light incident plane of the optical element, the transparent frame quality is enhanced, the transparent-displaying performance is improved, the technical problem of prior art is solved; the technical problem being the poor quality of the transparent frames of the transparent display device.

To allow the present invention to be more clearly understood, preferred embodiments are given below, and accompanied with drawings, and are described in detail as follows:

DETAILED DESCRIPTION OF THE PREFERRED EMBODIMENTS

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention.

In the drawings, those units with similar structures are marked with the same labels.

Figure 2:
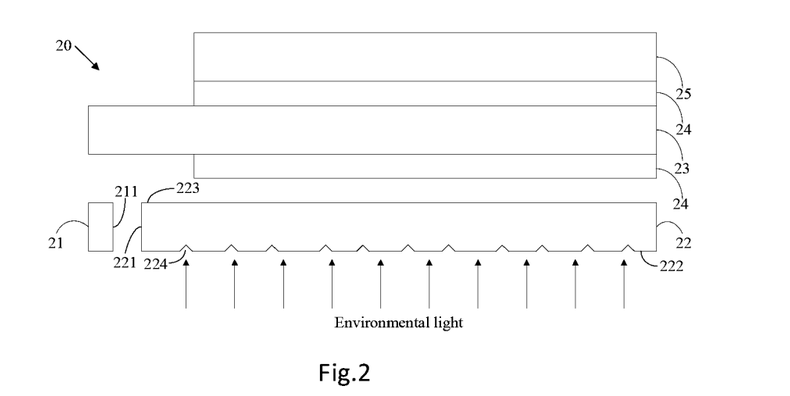
FIG. 2 is a schematic structural view of a first preferred embodiment of a transparent display device of the present invention.

FIG. 2 is a schematic structural view of a first preferred embodiment of a transparent display device 20 of the present invention. In this preferred embodiment, a transparent display device 20 comprises a display module and a backlight module.

The display module comprises a liquid crystal display panel 23, polarizers 24 and an optical thin film 25. The liquid crystal display panel 23 is configured to display image pixels and comprises a top substrate, a bottom substrate and a liquid crystal layer disposed between the top substrate and the bottom substrate. The polarizers 24 are disposed on a light emitting plane and a light incident plane of the liquid crystal display panel 23 to form a corresponding polarizing light. The optical thin film 25 such as an anti-reflective film is disposed on the polarizer 24 of the light emitting plane of the liquid crystal display panel 23 to improve a display performance of the liquid crystal display panel 23.

The backlight module comprises a light source 21 and a light guide plate 22. The light source 21 is used to provide an emitting light. The light guide plate 22 is used to guide the emitting light of the light source 21 and the environmental light into the liquid crystal display panel 23.

The light guide plate 22 comprises a first light incident plane 221, a second light incident plane 222 and a light emitting plane 223. The first light incident plane 221 is used to guide the emitting light of the light source 21. The second light incident plane 222 is used to guide the environmental light. The light emitting plane 223 is used to guide the emitting light and the environmental light into the liquid crystal display panel 23. The first light incident plane 221 of the light guide plate 22 is disposed opposite to a light emitting plane 211 of the light source 21. A plurality of caves 224 are disposed on the second light incident plane 222 of the light guide plate 22 to enhance the environmental light. The light emitting plane 223 of the light guide plate 22 is disposed opposite to the light incident plane of the liquid crystal panel 23, the second light incident plane 222 of the light guide plate 22 and the light emitting plane 223 of the light guide plate 22 are disposed on two ends of the light guide plate 22.

During the use of the transparent display device 20 of the first preferred embodiment, the users can open the light source 21 while needing to look the display content of the liquid crystal display panel 23, so that the first light incident plane 221 of the light guide plate 22 receives the emitting light of the light source 21, and the emitting light is guided into the liquid crystal display panel 23 which displays the content of corresponding images by the emitting light, so as to satisfy the user's need for watching images.

The users can close the light source 21 while needing to look objects behind the transparent display device 20, the environmental light emitted by the objects behind the transparent display device 20 is guided into the liquid crystal display panel 23 through the second light incident plane 222 of the light guide plate 22 in order to show the objects behind the liquid display device 20 in the liquid crystal display panel 23 by the environmental light.

When an environmental light is incident to the second light incident plane 222 of the light guide plate 22, due to a problem of angles, eventually a part of the environmental light cannot be emitted from the light emitting plane of the light guide plate 22, invoking a poor transparent-displaying performance of the transparent display device 20. A plurality of caves 224 are disposed on the second light incident plane 222 of the light guide plate 22; the caves 224 have a function of condensing light, making a larger amount of environmental light incident to the light guide plate 22 at smaller angles, so that the environmental light can be emitted from the light emitting plane 223 of the light guide plate 22, and then the transparent-displaying performance of the transparent device 20 increases.

In this preferred embodiment, the transparent display device increases an incident amount of the environmental light by disposing the caves on the second light incident plane of the light guide plate so that the transparent frame quality of the transparent display device improves, and then the transparent-displaying performance of the transparent device improves.

Figure 3:
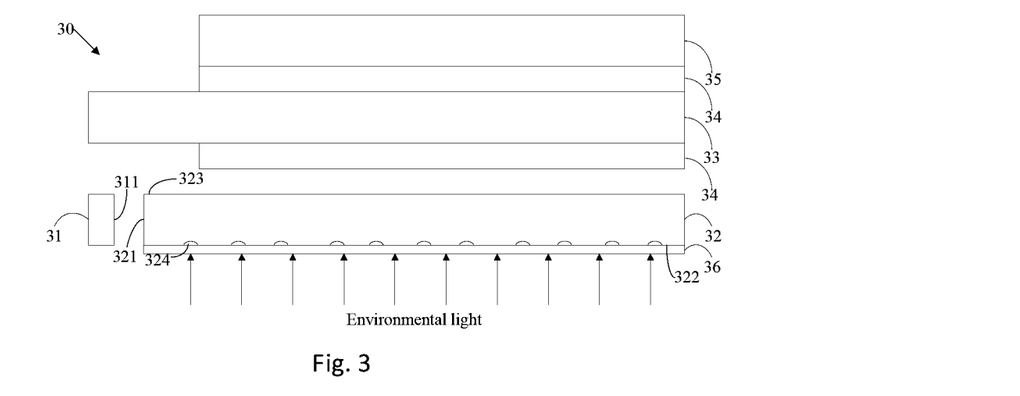
FIG. 3 is a schematic structural view of a second preferred embodiment of a transparent display device of the present invention.

FIG. 3 is a schematic structural view of a second preferred embodiment of a transparent display device 30 of the present invention. In this preferred embodiment, a transparent display device 30 comprises a display module and a backlight module.

The display module comprises a liquid crystal display panel 33, polarizers 34, and an optical thin film 35. The liquid crystal display panel 33 is configured to display image pixels and comprises a top substrate, a bottom substrate and a liquid crystal layer disposed between the top substrate and the bottom substrate. The polarizers 34 are disposed on a light emitting plane and a light incident plane of the liquid crystal display panel 33 to form a corresponding polarizing light. The optical thin film 35 such as an anti-reflective film is disposed on the polarizer 34 of the light emitting plane of the liquid crystal display panel 33 to improve a display performance of the liquid crystal display panel 33.

The backlight module comprises a light source 31, a light guide plate 32, and a brightness enhancement film 36. The light source 31 is used to provide emitting light. The light guide plate 32 is used to guide the emitting light of the light source 31 and the environmental light to the liquid crystal display panel 33.

The light guide plate 32 comprises a first light incident plane 321, a second light incident plane 322, and a light emitting plane 323. The first light incident plane 321 is used to guide the emitting light of the light source 31. The second light incident plane 322 is used to guide the environmental light. The light emitting plane 323 is used to guide the emitting light and the environmental light into the liquid crystal display panel 33. The first light incident plane 321 of the light guide plate 32 is disposed opposite to a light emitting plane 311 of the light source 31. A plurality of caves 324 are disposed on the second light incident plane 322 of the light guide plate 32 to enhance the environmental light. The light emitting plane 323 of the light guide plate 32 is disposed opposite to the light incident plane of the liquid crystal panel 33. The second light incident plane 322 of the light guide plate 32 and the light emitting plane 323 of the light guide plate 32 are disposed on two ends of the light guide plate 32. The brightness enhancement film 36 is disposed on the second light incident plane 322 of the light guide plate 32.

The operation theory of the transparent display device 30 of the second preferred embodiment is the same as or similar to that of the transparent display device 20 of the first preferred embodiment. By disposing the brightness enhancement film 36 on the second light incident plane 322 of the light guide plate 32, an incident amount of environmental light is further enlarged so that the transparent frame quality of the transparent display device 30 increases, and then the transparent-displaying performance of the transparent device 30 improves.

Figure 4:
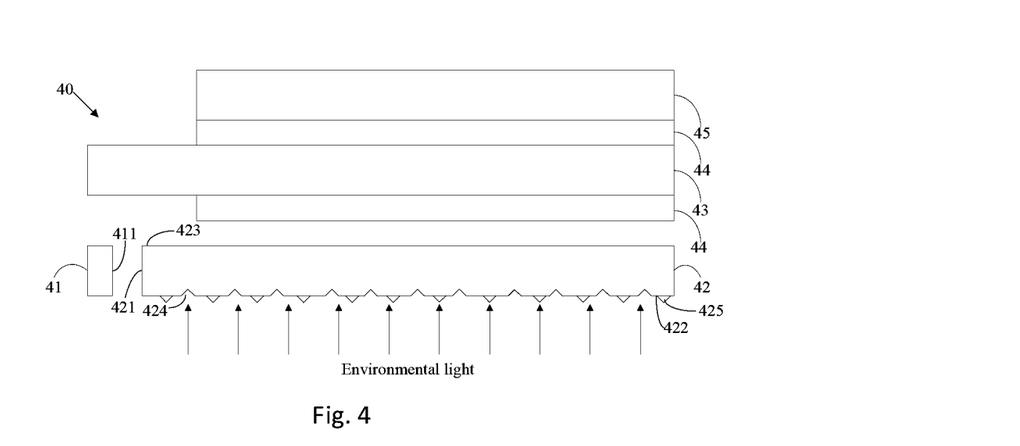
FIG. 4 is a schematic structural view of a third preferred embodiment of a transparent display device of the present invention.

FIG. 4 is a schematic structural view of a third preferred embodiment of a transparent display device 40 of the present invention. In this preferred embodiment, a transparent display device 40 comprises a display module and a backlight module.

The display module comprises a liquid crystal display panel 43, polarizers 44 and an optical thin film 45. The liquid crystal display panel 43 is configured to display image pixels and comprises a top substrate, a bottom substrate, and a liquid crystal layer disposed between the top substrate and the bottom substrate. The polarizers 44 are disposed on a light emitting plane and a light incident plane of the liquid crystal display panel 43 to form a corresponding polarizing light. The optical thin film 45 such as an anti-reflective film is disposed on the polarizers 44 of the light emitting plane of the liquid crystal display panel 43 to improve a display performance of the liquid crystal display panel 43.

The backlight module comprises a light source 41 and a light guide plate 42. The light source 41 is used to provide an emitting light. The light guide plate 42 is used to guide the emitting light of the light source 41 and the environmental light to the liquid crystal display panel 43. The light guide plate 42 comprises a first light incident plane 421, a second light incident plane 422 and a light emitting plane 423. The first light incident plane 421 is used to guide the emitting light of the light source 41. The second light incident plane 422 is used to guide the environmental light. The light emitting plane 423 is used to guide the emitting light and the environmental light into the liquid crystal display panel 43. The first light incident plane 421 of the light guide plate 42 is disposed opposite to a light emitting plane 411 of the light source 41. The light emitting plane 423 of the light guide plate 42 is disposed opposite to the light incident plane of the liquid crystal panel 43. The second light incident plane 422 of the light guide plate 42 is disposed on two ends of the light guide plates 42. A plurality of caves 424 and a plurality of protrusions 425 are disposed in interlacing on the second light incident plane 422 of the light guide plate 42 so as to enhance the environmental light.

During the use of the transparent display device 40 of this preferred embodiment, the caves 424 and the protrusions 425 on the second light incident plane 422 of the light guide plate 42 can make a large amount of environmental light incident into the light guide plate 42 at smaller angles, and the disposal of the protrusions 425 would not greatly affect radiating of the emitting light of the light source 41. This will assure the transparent frame quality of the transparent display device 40 and the non-transparent frame quality of the transparent display device 40.

Figure 5:
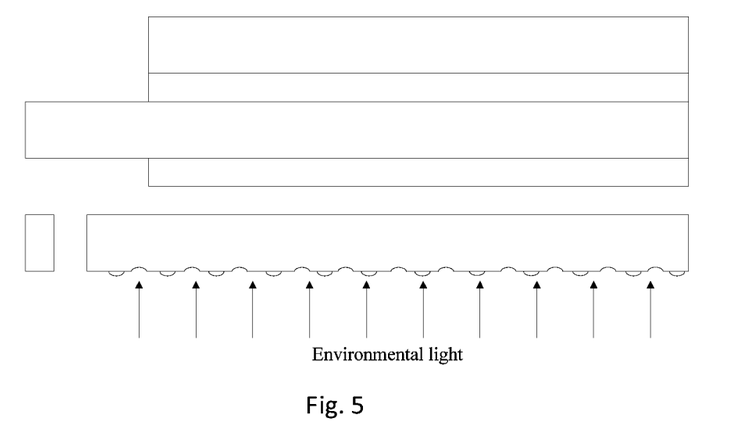
FIG. 5 is a schematic structural view of a fourth preferred embodiment of a transparent display device of the present invention.

FIG. 5 is a schematic structural view of a fourth preferred embodiment of a transparent display device of the present invention. The caves and the protrusions on the second light incident plane of the light guide plate could be formed in different kinds of shapes, including but not limited to triangles, trapezoids, or ovals. As shown in FIG. 5, the shape of the caves and the protrusions are ovals. As shown in FIG. 4, the shape of the caves and the protrusions are triangles. The caves and the protrusions with the shapes mentioned above can enlarge the incident amount of the environmental light into the light guide plate well.

Figure 6:
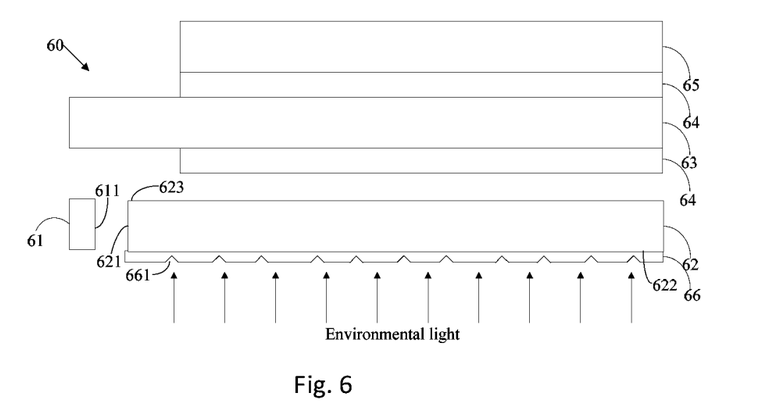
FIG. 6 is a schematic structural view of a fifth preferred embodiment of a transparent display device of the present invention.

FIG. 6 is a schematic structural view of a fifth preferred embodiment of a transparent display device of the present invention. In this preferred embodiment, a transparent display device 60 comprises a display module and a backlight module.

The display module comprises a liquid crystal display panel 63, polarizers 64, and an optical thin film 65. The liquid crystal display panel 63 is configured to display image pixels, comprises a top substrate, a bottom substrate and a liquid crystal layer disposed between the top substrate and the bottom substrate. The polarizers 64 are disposed on a light emitting plane and a light incident plane of the liquid crystal display panel 63 to form a corresponding polarizing light. The optical thin film 65 such as an anti-reflective film is disposed on the polarizers 64 of the light emitting plane of the liquid crystal display panel 63 to improve the display performance of the liquid crystal display panel 63.

The backlight module comprises a light source 61, a light guide plate 62, and an optical element 66. The light source 61 is used to provide emitting light. The light guide plate 62 is used to guide the emitting light of the light source 61 and environmental light into the liquid crystal display panel 63.

The light guide plate 62 comprises a first light incident plane 621, a second light incident plane 622, and a light emitting plane 623. The first light incident plane 621 is used to guide the emitting light of the light source 61. The second light incident plane 622 is used to guide the environmental light. The light emitting plane 623 is used to guide the emitting light and the environmental light into the liquid crystal display panel 63. The first light incident plane 621 of the light guide plate 62 is disposed opposite to a light emitting plane 611 of the light source 61. The light emitting plane 623 of the light guide plate 62 is disposed opposite to the light incident plane of the liquid crystal panel 63, the second light incident plane 622 of the light guide plate 62 and the light emitting plane 623 of the light guide plate 62 are disposed on two ends of the light guide plate 62. The optical element 66 is disposed on the second light incident plane 622 of the light guide plate 62, and a plurality of caves 661 is disposed on a light incident plane of the optical element 66 to enhance the environmental light. The shapes of the caves 661 include, but are not limited to, triangles, trapezoids, or ovals.

During the use of the transparent display device 60 of this preferred embodiment, the users can close the light source 61 while needing to look objects behind the transparent display device 60. The environmental light emitted by the objects behind the transparent display device 60 is guided into the liquid crystal display panel 63, through the optical element 66, the second light incident plane 622 of the light guide plate 62, and the liquid crystal display panel 63, in order to show the objects behind the liquid display device 60 in the liquid crystal display panel 63 by the environmental light.

While the environmental light is incident to the optical element 66, the caves 661 have a function of condensing light, making a large amount of the environmental light incident to the light guide plate 62 at smaller angles, so that large amount of the environmental light can be emitted from the light emitting plane 623 of the light guide plate 62, and then the transparent-displaying performance of the transparent device 60 improves. Meanwhile, the disposal of the caves 661 on the optical element 66 would not affect radiating of the emitting light of the light source 61. This will assure the transparent frame quality of the transparent display device 60 and the non-transparent frame quality of the transparent display device 60.

In the transparent display device of this preferred embodiment, by disposing the caves on the second light incident film of the optical element, an incident amount of environmental light is enlarged so that the transparent frame quality of the transparent display device increases, and then the transparent-displaying performance of the transparent device improves.

Figure 7:
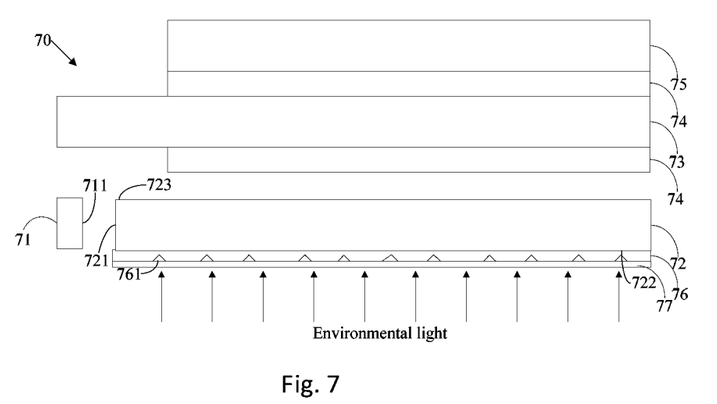
FIG. 7 is a schematic structural view of a sixth preferred embodiment of a transparent display device of the present invention.

FIG. 7 is a schematic structural view of a sixth preferred embodiment of a transparent display device of the present invention. In this preferred embodiment, a transparent display device 70 comprises a display module and a backlight module.

The display module comprises a liquid crystal display panel 73, polarizers 74, and an optical thin film 75. The liquid crystal display panel 73 is configured to display image pixels and comprises a top substrate, a bottom substrate, and a liquid crystal layer (not shown) disposed between the top substrate and the bottom substrate. The polarizers 74 are disposed on a light emitting plane and a light incident plane of the liquid crystal display panel 73 so as to form a corresponding polarizing light. The optical thin film 75 such as an anti-reflective film is disposed on the polarizer 74 of the light emitting plane of the liquid crystal display panel 73 to improve the display performance of the liquid crystal display panel 73.

The backlight module comprises a light source 71, a light guide plate 72, an optical element 76, and a brightness enhancement film 77. The light source 71 is used to provide emitting light. The light guide plate 72 is used to guide the emitting light of the light source and environmental light into the liquid crystal display panel 73.

The light guide plate 72 comprises a first light incident plane 721, a second light incident plane 722, and a light emitting plane 723. The first light incident plane 721 is used to guide the emitting light of the light source 71. The second light incident plane 722 is used to guide the environmental light. The light emitting plane 723 is used to guide the emitting light and the environmental light into the liquid crystal display panel 73. The first light incident plane 721 of the light guide plate 72 is disposed opposite to a light emitting plane 711 of the light source 71. The light emitting plane 723 of the light guide plate 72 is disposed opposite to the light incident plane of the liquid crystal display panel 73. The second light incident plane 722 of the light guide plate 72 and the light emitting plane 723 of the light guide plate 72 are disposed on two ends of the light guide plate 72. The optical element 76 is disposed on the second light incident plane 722 of the light guide plate 72, and a plurality of caves 761 is disposed on a light incident plane of the optical element 76 to enhance the environmental light. The shapes of the caves 766 include, but are not limited to, triangles, trapezoids, or ovals. The brightness enhancement film 77 is disposed on the light incident plane of the optical element 76.

The operation theory of the transparent display device 70 of the sixth preferred embodiment is the same as or similar to that of the transparent display device 60 of the fifth preferred embodiment. By disposing the brightness enhancement film 77 on the light incident plane of the optical element 76, an incident amount of environmental light is further enlarged so that the transparent frame quality of the transparent display device 70 increases, and then the transparent-displaying performance of the transparent device 70 improves.

In the present invention, the transparent display device raises an incident amount of the environmental light by disposing the caves on the second light incident plane and the light incident plane of the optical element, so that the transparent frame quality of the transparent display device increases, and then the transparent-displaying performance of the transparent device improves, thereby solving the technical problem of the prior transparent display device where its transparent frames has the poor quality.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. A transparent display device, comprising:
   a display module, which comprises:
      a liquid crystal display panel configured to display image pixels;
      polarizers disposed on a light emitting plane and a light incident plane of the liquid crystal display panel to form a corresponding polarizing light; and
      an optical thin film disposed on the polarizer of the light emitting plane of the liquid crystal display panel to improve a display performance of the liquid crystal display panel; and
   a backlight module, which comprises:
      a light source used to provide emitting light; and
      a light guide plate used to guide the emitting light of the light source and environmental light into the liquid crystal display panel;
   wherein the light guide plate comprises a first light incident plane, a second light incident plane and a light emitting plane, the first light incident plane is disposed opposite to a light emitting plane of the light source, a plurality of caves are disposed on the second light incident plane to enhance the environmental light;
   the light emitting plane of the light guide plate is disposed opposite to the light incident plane of the liquid crystal panel, the second light incident plane of the light guide plate and the light emitting plane of the light guide plate are disposed on two ends of the light guide plate;
   a plurality of protrusions disposed on the second light incident plane of the light guide plate to enhance the environmental light;
   wherein the optical thin film is an anti-reflective film and is a passive element;
   wherein when the light source is off, the environmental light penetrates the display module and shows an environmental image as viewed from the optical film to the second light incident plane.

2. The transparent display device according to claim 1, wherein the backlight module further comprises:
   a brightness enhancement film disposed on the second light incident plane of the light guide plate.

3. The transparent display device according to claim 1, wherein the caves and the protrusions are disposed in interlacing.

4. The transparent display device according to claim 1, wherein the caves are shaped in triangles, trapezoids, or ovals.

5. The transparent display device according to claim 1, wherein the protrusions are shaped in triangles, trapezoids, or ovals.

6. A transparent display device, comprising:
   a display module, which comprises:
      a liquid crystal display panel configured to display image pixels;
      polarizers disposed on a light emitting plane and a light incident plane of the liquid crystal display panel to form a corresponding polarizing light; and
      an optical thin film disposed on the polarizer of the light emitting plane of the liquid crystal display panel to improve a display performance of the liquid crystal display panel; and
   a backlight module, which comprises:
      a light source used to provide emitting light; and
      a light guide plate used to guide the emitting light of the light source and environmental light into the liquid crystal display panel;
   wherein the light guide plate comprises a first light incident plane, a second light incident plane, and a light emitting plane, the first light incident plane is disposed opposite to a light emitting plane of the light source, a plurality of caves are disposed on the second light incident plane to enhance the environmental light;
   wherein the optical thin film is an anti-reflective film and is a passive element;
   wherein when the light source is off, the environmental light penetrates the display module and shows an environmental image as viewed from the optical film to the second light incident plane.

7. The transparent display device according to claim 6, wherein the light emitting plane of the light guide plate is disposed opposite to the light incident plane of the liquid crystal panel, the second light incident plane of the light guide plate and the light emitting plane of the light guide plate are disposed on two ends of the light guide plate.

8. The transparent display device according to claim 6, wherein the backlight module further comprises:
   a brightness enhancement film disposed on the second light incident plane of the light guide plate.

9. The transparent display device according to claim 6, wherein a plurality of protrusions are disposed on the second light incident plane of the light guide plate to enhance the environmental light.

10. The transparent display device according to claim 9, wherein the caves and the protrusions are disposed in interlacing.

11. The transparent display device according to claim 10, wherein the caves are shaped in triangles, trapezoids, or ovals.

12. The transparent display device according to claim 10, wherein the protrusions are shaped in triangles, trapezoids, or ovals.

13. A transparent display device, comprising:
   a display module, which comprises:
      a liquid crystal display panel configured to display image pixels;
      polarizers disposed on a light emitting plane and a light incident plane of the liquid crystal display panel to form a corresponding polarizing light; and
      an optical thin film disposed on the polarizer of the light emitting plane of the liquid crystal display panel to improve a display performance of the liquid crystal display panel; and
   a backlight module, which comprises:
      a light source used to provide emitting light; and
      a light guide plate comprises a first light incident plane, a second light incident plane, and a light emitting plane; the light guide plate used to guide the emitting light of the light source and environmental light into the liquid crystal display panel, the first light incident plane is disposed opposite to a light emitting plane of the light source;

an optical element disposed on the second light incident plane of the light guide plate, a plurality of caves are disposed on a light incident plane of the optical element to enhance the environmental light;

wherein the optical thin film is an anti-reflective film and is a passive element;

wherein when the light source is off, the environmental light penetrates the display module and shows an environmental image as viewed from the optical film to the second light incident plane.

14. The transparent display device according to claim 13, wherein the light emitting plane of the light guide plate is disposed opposite to the light incident plane of the liquid crystal panel, the second light incident plane of the light guide plate and the light emitting plane of the light guide plate are disposed on two ends of the light guide plate.

15. The transparent display device according to claim 6, wherein the backlight module further comprises:

a brightness enhancement film disposed on the light incident plane of the optical element.

16. The transparent display device according to claim 10, wherein the caves are shaped in triangles, trapezoids, or ovals.

* * * * *